US012680988B2

(12) United States Patent
Yang et al.

(10) Patent No.: US 12,680,988 B2
(45) Date of Patent: Jul. 14, 2026

(54) ANALYSIS OF OLIGOSACCHARIDES USING A LIQUID CHROMATOGRAPHY SYSTEM AND A CHROMATOGRAPHIC COLUMN IN WHICH THE LC SYSTEM AND COLUMN'S INTERNAL METAL SURFACE HAS BEEN MODIFIED WITH A LAYER OF INERT MATERIAL

(71) Applicant: Waters Technologies Corporation, Milford, MA (US)

(72) Inventors: Jinchuan Yang, Hopkinton, MA (US); Paul Rainville, Princeton, MA (US)

(73) Assignee: Waters Technologies Corporation, Milford, MA (US)

( * ) Notice: Subject to any disclaimer, the term of this patent is extended or adjusted under 35 U.S.C. 154(b) by 319 days.

(21) Appl. No.: 18/599,970

(22) Filed: Mar. 8, 2024

(65) Prior Publication Data

US 2024/0302334 A1 Sep. 12, 2024

Related U.S. Application Data

(60) Provisional application No. 63/489,505, filed on Mar. 10, 2023.

(51) Int. Cl.
G01N 30/56 (2006.01)
G01N 30/04 (2006.01)
(Continued)

(52) U.S. Cl.
CPC .............. G01N 30/56 (2013.01); G01N 30/06 (2013.01); G01N 30/7233 (2013.01);
(Continued)

(58) Field of Classification Search
CPC .... G01N 30/56; G01N 30/06; G01N 30/7233; G01N 30/74; G01N 2030/045;
(Continued)

(56) References Cited

U.S. PATENT DOCUMENTS

2019/0086371 A1    3/2019    Lauber et al.
2019/0184372 A1    6/2019    Kato et al.
(Continued)

FOREIGN PATENT DOCUMENTS

WO        2020174402 A1    9/2020
WO        WO-2020252677 A1 * 12/2020 ............. G01N 30/02

OTHER PUBLICATIONS

Cuany et al. "Determination of ß-Galactooligosaccharides (GOS) in Infant Formula and Adult Nutritionals: Single-Laboratory Validation, First Action Jan. 2021." J. AOAC Int. 105.1(2022): 142-158.
(Continued)

*Primary Examiner* — Marrit Eyassu

(74) *Attorney, Agent, or Firm* — WOMBLE BOND DICKINSON (US) LLP; Deborah M. Vernon; Ricardo Joseph

(57) ABSTRACT

The present disclosure is directed to methods of separating one or more non-modified oligosaccharide(s) with degree of polymerization 6 or higher from a sample using a hydrophilic interaction liquid chromatography (HILIC) column connected to a liquid chromatography system that includes coated flow paths. The methods disclosed herein requires, inter alia, a liquid chromatography system, wherein at least one component of the LC system includes a fluid-contacting alkylsilyl coating. When implementing a standard HILIC method, the methods of the present technology can be used to decrease the analyte loss and/or carry-over of the separation leading to improved analysis.

20 Claims, 8 Drawing Sheets

(51) Int. Cl.
  *G01N 30/06*      (2006.01)
  *G01N 30/72*      (2006.01)
  *G01N 30/74*      (2006.01)

(52) U.S. Cl.
  CPC ....... *G01N 30/74* (2013.01); *G01N 2030/045*
             (2013.01); *G01N 2030/567* (2013.01)

(58) Field of Classification Search
  CPC ............ G01N 2030/567; G01N 30/88; G01N
             2030/8836; B01D 15/206; B01D 15/22;
             B01D 15/305; C07H 3/06; B05D 1/60;
                                       B05D 2518/10
  USPC ........................................................ 73/61.53
  See application file for complete search history.

(56)                    References Cited

U.S. PATENT DOCUMENTS

2020/0271629 A1*   8/2020  Lauber .................. B01D 15/22
2021/0138361 A1*   5/2021  Lauber ................ B01J 20/3293
2021/0164094 A1*   6/2021  Shiner .................. C23C 16/045
2022/0118443 A1    4/2022  DeLano et al.

OTHER PUBLICATIONS

International Search Report and Written Opinion issued in International Patent Application No. PCT/IB2024/052273 dated May 29, 2024.

* cited by examiner

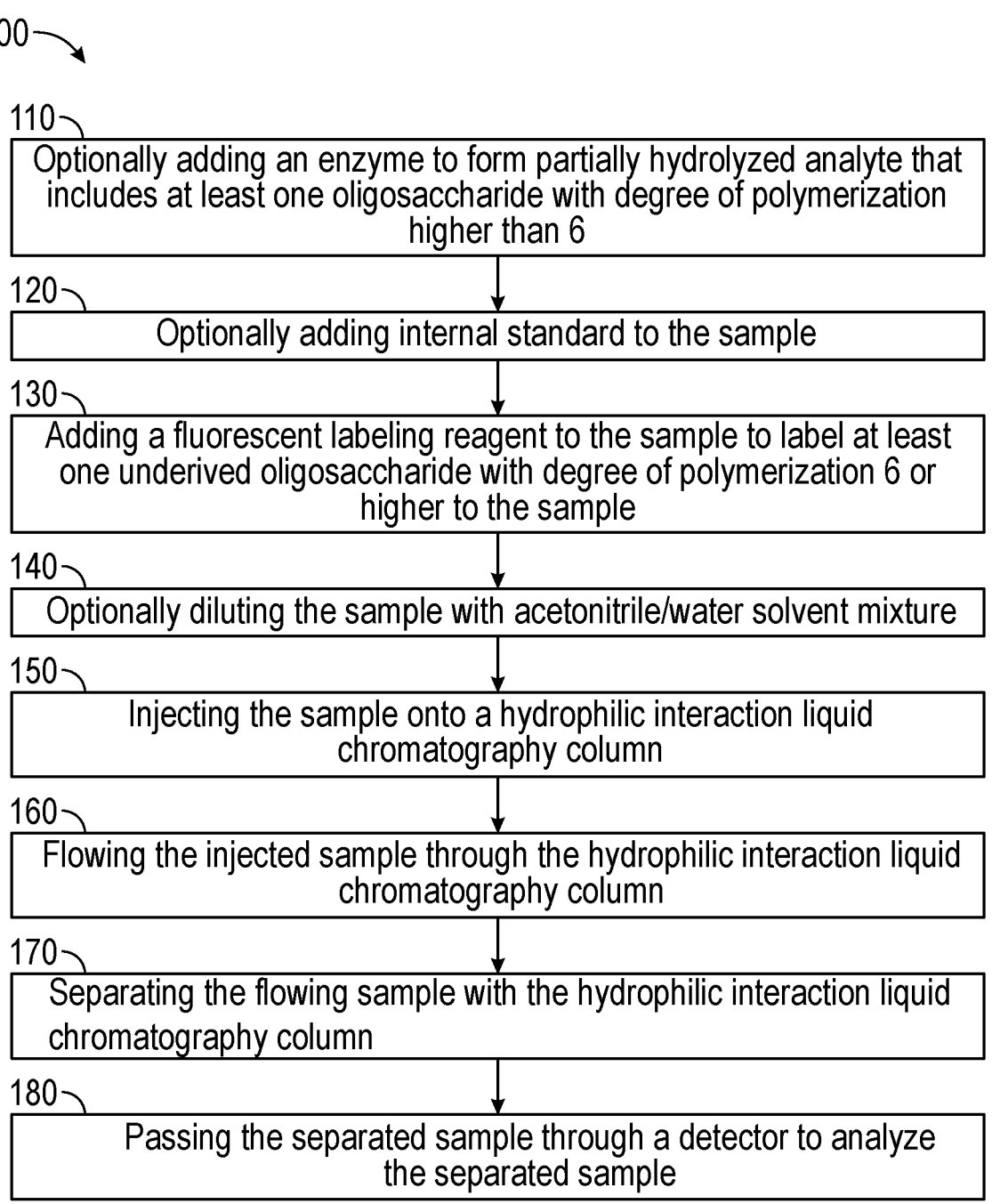

100

110
Optionally adding an enzyme to form partially hydrolyzed analyte that includes at least one oligosaccharide with degree of polymerization higher than 6

120
Optionally adding internal standard to the sample

130
Adding a fluorescent labeling reagent to the sample to label at least one underived oligosaccharide with degree of polymerization 6 or higher to the sample 140
Optionally diluting the sample with acetonitrile/water solvent mixture 150
Injecting the sample onto a hydrophilic interaction liquid chromatography column 160
Flowing the injected sample through the hydrophilic interaction liquid chromatography column 170
Separating the flowing sample with the hydrophilic interaction liquid chromatography column 180
Passing the separated sample through a detector to analyze the separated sample

FIG. 1

Premier Column, Injection of Dextran Calibration Ladder

Premier Column, Injection of Solvent Blank after the Dextran Calibration Ladder

ANALYSIS OF OLIGOSACCHARIDES USING A LIQUID CHROMATOGRAPHY SYSTEM AND A CHROMATOGRAPHIC COLUMN IN WHICH THE LC SYSTEM AND COLUMN'S INTERNAL METAL SURFACE HAS BEEN MODIFIED WITH A LAYER OF INERT MATERIAL

RELATED APPLICATIONS

This application claims the benefit of U.S. Provisional Application No. 63/489,505, filed Mar. 10, 2023, the entire disclosure of which is incorporated herein by reference.

FIELD OF THE TECHNOLOGY

The present disclosure relates to the use of a hydrophilic interaction liquid chromatography column and related liquid chromatography systems that includes coated flow paths for analysis of non-modified oligosaccharides. More specifically, this technology relates to methods of isolating one or more non-modified oligosaccharide with degree of polymerization 6 or higher from a sample using a hydrophilic interaction liquid chromatography column that includes fluid-contacting alkylsilyl coating on at least some portion of its flow path. The methods of the present technology can be used to decrease the analyte loss and/or carry-over of the separation leading to improved analysis of non-modified oligosaccharides, e.g., galactooligosaccharides.

BACKGROUND

The material of choice for chromatographic flow paths is often metal in nature due to the desire to have high pressure capable chromatographic systems with minimal dispersion. However, metal-analyte interaction in liquid chromatography (LC) is a big concern for certain groups of analytes, such as phosphorylated peptides, oligonucleotides, proteins, phosphorylated glycans, and organic acids. These analytes contain strong metal complexing or chelating functional groups, such as phosphate, carboxylate (conjugate base of carboxylic acid), amine and amide, that interact with metal (metal ion or metal oxide) in LC systems (including columns).

While analytes including strong metal complexing groups cause issues in LC, such as loss of analyte recovery, peak tailing, and carry-over, etc., to our knowledge, there has been no report on any detrimental effects caused by interaction of non-modified carbohydrates with metal surfaces.

Carbohydrates play significant roles in living organisms. They can serve as energy sources, structural components, and functional molecules that maintain the well-being of the human body. Among the carbohydrates, oligosaccharides, such as β-galactooligosaccharides (GOSs), are getting more attention recently due to their potential health benefits such as prebiotics. Analysis of oligosaccharides often involve hydrophilic interaction chromatography (HILIC), e.g., using standard published protocols, such as, AOAC Official Method 2021.01 (available from AOAC International, Rockville, MD) for analysis of β-galactooligosaccharides (GOS) in infant formula and adult nutritional formulation. See, e.g., Cuany et al., Journal of AOAC INTERNATIONAL, 105(1), 2022, 142-158. The reference is incorporated herein by reference in its entirety.

In this study, issues such as analyte loss and carry-over were observed while separating non-modified oligosaccharides with degree of polymerization 6 or higher under certain conditions when traditional stainless-steel hardware was used in a LC system. Specifically, analyte loss and carry-over were observed for analysis of dextran molecules with degree of polymerization (DP) of six or higher under the recommended conditions in an international standard method (i.e., AOAC Official Method 2021.01 (available from AOAC International, Rockville, MD) for separation of galactooligosaccharide by HILIC-FLR).

Ongoing efforts to reduce analyte loss and carry-over in traditional stainless-steel LC systems in an effort to facilitate improved chromatographic separation are therefore needed.

SUMMARY

A substantially inert layer of alkylsilyl coating, which shields the metal surfaces of LC systems from interacting with metal-sensitive analytes has been proved to provide a reliable solution to mitigate the metal-analyte interaction issues in LC systems for analysis of strong metal chelating or complexing analytes, e.g., oligonucleotides. Accordingly, so far, the analytes that benefit from the effect of alkyl coating on LC systems are mainly the compounds that contain strong metal complexing or chelating functional groups, such as phosphate, carboxylate (conjugate base of carboxylic acid), amine and amide. For non-modified oligosaccharides (no additional functional group on common oligosaccharides—e.g., neutral saccharides), there has been no report so far to show the effect of alkyl coating of LC on analysis of non-modified oligosaccharides since oligosaccharides are not expected to be strong metal interacting analytes in the field.

However, in this disclosure, it is demonstrated that an alkylsilyl coating used in LC systems that has been designed to minimize negative analyte/surface interactions for metal sensitive analytes is also a viable solution to solve the issues of analyte loss and carry-over for analysis of oligosaccharides with degree of polymerization (DP) of six or higher.

In some examples, oligosaccharides with degree of polymerization (DP) of six or higher were tested with and without the coating on the column hardware. It is also found that oligosaccharides with DP less than six do not suffer any analyte loss or carry-over issue in traditional LC systems.

The significance of the findings of the present disclosure is that it proves for the first time that the size of the analyte can play an important role for analysis of weak metal interacting analytes, e.g., oligosaccharides, neutral saccharides.

To address problems experienced in separations of oligosaccharides with degree of polymerization (DP) of six or higher in metal fluidic systems, LC systems coated with alkylsilyl coating designed to minimize negative analyte/surface interactions are used in the methods of present disclosure.

The methods disclosed herein improve liquid chromatography separations for oligosaccharides with degree of polymerization (DP) of six or higher when implementing a standard hydrophilic interaction liquid chromatography (HILIC) method, i.e., AOAC Official Method 2021.01 (available from AOAC International, Rockville, MD). For example, the methods of the present technology can be used to decrease the analyte loss and/or carry-over, of the separation leading to better-quality analysis.

In one aspect, provided herein is a method of separating and analyzing a sample comprising one or more non-modified oligosaccharides with degree of polymerization 6 or higher. The method comprises: providing a hydrophilic interaction liquid chromatography (HILIC) column, wherein at least one component of the HILIC column comprises a fluid-contacting alkylsilyl coating on metal surfaces; injecting the sample onto the HILIC column;

flowing the sample through the HILIC column; and separating and analyzing the sample, wherein carry-over of the one or more non-modified oligosaccharides with degree of polymerization 6 or higher is decreased at least 10× compared to an uncoated HILIC column.

In some examples of the above aspect, the analyzing step comprises analyzing the separated sample and a blank sample injected after the separated sample with a detector to determine the amount of carry-over.

In some examples of the above aspect, carry-over of the one or more non-modified oligosaccharides with degree of polymerization 6 or higher is decreased at least 15× compared to an uncoated HILIC column. In some examples of the above aspect, carry-over of the one or more non-modified oligosaccharides with degree of polymerization 6 or higher is decreased 20× compared to an uncoated HILIC column.

In some examples of the above aspect, the fluid-contacting alkylsilyl coating comprises a vapor deposited product of bis(trichlorosilyl)ethane or bis(trimethoxysilyl)ethane.

In some examples of the above aspect, the fluid-contacting alkylsilyl coating has a contact angle less than or equal to 300 or less than or equal to 90°.

In some examples of the above aspect, the fluid-contacting alkylsilyl coating has a thickness of at least 100 Å.

In some examples of the above aspect, the method further comprises connecting the HILIC column to a liquid chromatography system, wherein internal surfaces of the liquid chromatography system are coated with the fluid-contacting alkylsilyl coating.

In some examples of the above aspect, the one or more non-modified oligosaccharides with degree of polymerization 6 or higher is selected from the group consisting of galactooligosaccharides (GOS), fructooligosaccharide, and combination thereof.

In some examples of the above aspect, the sample comprises dextran.

In some examples of the above aspect, the total weight concentration of the one or more non-modified oligosaccharides with degree of polymerization 6 or higher in the sample is from about 0.0005% to about 5% of the sample. In some examples of the above aspect, wherein the total weight concentration of the one or more non-modified oligosaccharides with degree of polymerization 6 or higher in the sample is from about 0.003% to about 1% of the sample.

In some examples of the above aspect, the analyzing comprises analyzing the separated sample with a UV detector, a fluorescence detector, a mass spectrometer, or a mass spectrometer coupled with a UV detector and/or a fluorescence detector.

In another aspect, the present disclosure provides a method of separating and analyzing one or more non-modified oligosaccharides with degree of polymerization 6 or higher from a sample. The disclosed method comprises: adding a fluorescent labeling reagent to the sample to label at least one of the one or more non-modified oligosaccharides with degree of polymerization 6 or higher to form a fluorescent labeled sample; injecting the fluorescent labeled sample onto a hydrophilic interaction liquid chromatography (HILIC) column, wherein at least one component of the HILIC column comprises a fluid-contacting alkylsilyl coating on a metal surface; flowing the injected sample through the HILIC column; separating the injected sample into components, wherein at least one of the components comprises a fluorescent labeled non-modified oligosaccharide with degree of polymerization 6 or higher; and analyzing the at least one of the components with a UV detector and/or a fluorescence detector.

In some examples of the above aspect, before injecting, the method further comprises: adding an internal standard in a known amount to the sample; diluting the fluorescent labeled sample with acetonitrile/water solvent mixture to form a diluted sample for injection; and wherein analyzing the at least one of the components comprises quantification of the at least one of the components using a detected peak area of the internal standard.

In some examples of the above aspect, the fluid-contacting alkylsilyl coating comprises a vapor deposited product of bis(trichlorosilyl)ethane or bis(trimethoxysilyl)ethane.

In some examples of the above aspect, the fluid-contacting alkylsilyl coating has a contact angle less than or equal to 300 or less than or equal to 90°.

In some examples of the above aspect, the fluid-contacting alkylsilyl coating has a thickness of at least 100 Å.

In some examples of the above aspect, the one or more non-modified oligosaccharides with degree of polymerization 6 or higher is selected from the group consisting of galactooligosaccharides (GOS), fructooligosaccharide and combination thereof. In some embodiments, the galactooligosaccharide is selected from the group consisting of β-galactooligosaccharide, α-galactooligosaccharide and galactan. In some examples of the above aspect, the non-modified oligosaccharide with degree of polymerization 6 or higher is β-galactooligosaccharide.

In some examples of the above aspect, the UV detector or the fluorescence detector is coupled to a mass spectrometer.

In some examples of the above aspect, the internal standard comprises laminaritriose.

In some examples of the above aspect, the method further comprises adding an enzyme selected from the group of consisting of amyloglucosidase, β-galactosidase and combination thereof to the sample prior to adding the internal standard.

In some examples of the above aspect, the sample included the added enzyme is kept at a temperature between 60° C. and 80° C. for at least 2 hours.

In some examples of the above aspect, wherein the fluorescent labeling reagent is 2-aminobenzamide or 6-amino-N-[2-(diethylamino) ethyl]-2-quinolinecarboxamide.

In some examples of the above aspect, wherein the sample is a nutritional bar, nutritional liquid, or nutritional powder.

In some examples, of any of the above aspects, the liquid chromatography system has a flow path defined by one or more of a sample reservoir container, a sample injection needle, and tubing. When the HILIC column is connected to the liquid chromatography system, the HILIC column becomes part of the flow path. One or more parts of the flow path can include the fluid-contacting alkylsilyl coating. For example, just the HILIC column can include the fluid-contacting alkylsilyl coating. Alternatively, at least some portion of the flow path (e.g., sample injection needle and tubing) together with the HILIC column can include the fluid-contacting alkylsilyl coating.

In general, the present methods enhance analyte recovery, reproducibility, and carry-over by, without wishing to be bound by the theory, minimizing negative analyte/surface interactions that can lead to sample losses. The present disclosure addresses the issues such as carry-over, analyte loss regarding HILIC separation of non-modified oligosaccharides with degree of polymerization 6 or higher from a sample.

BRIEF DESCRIPTION OF THE DRAWINGS

The technology will be more fully understood from the following detailed description taken in conjunction with the accompanying drawings, in which:

FIG. 1 shows a method 100 of isolating one or more non-modified oligosaccharide with degree of polymerization 6 or higher from a sample according to multiple embodiments of the present disclosure.

DETAILED DESCRIPTION

Figures 2A, 2B:
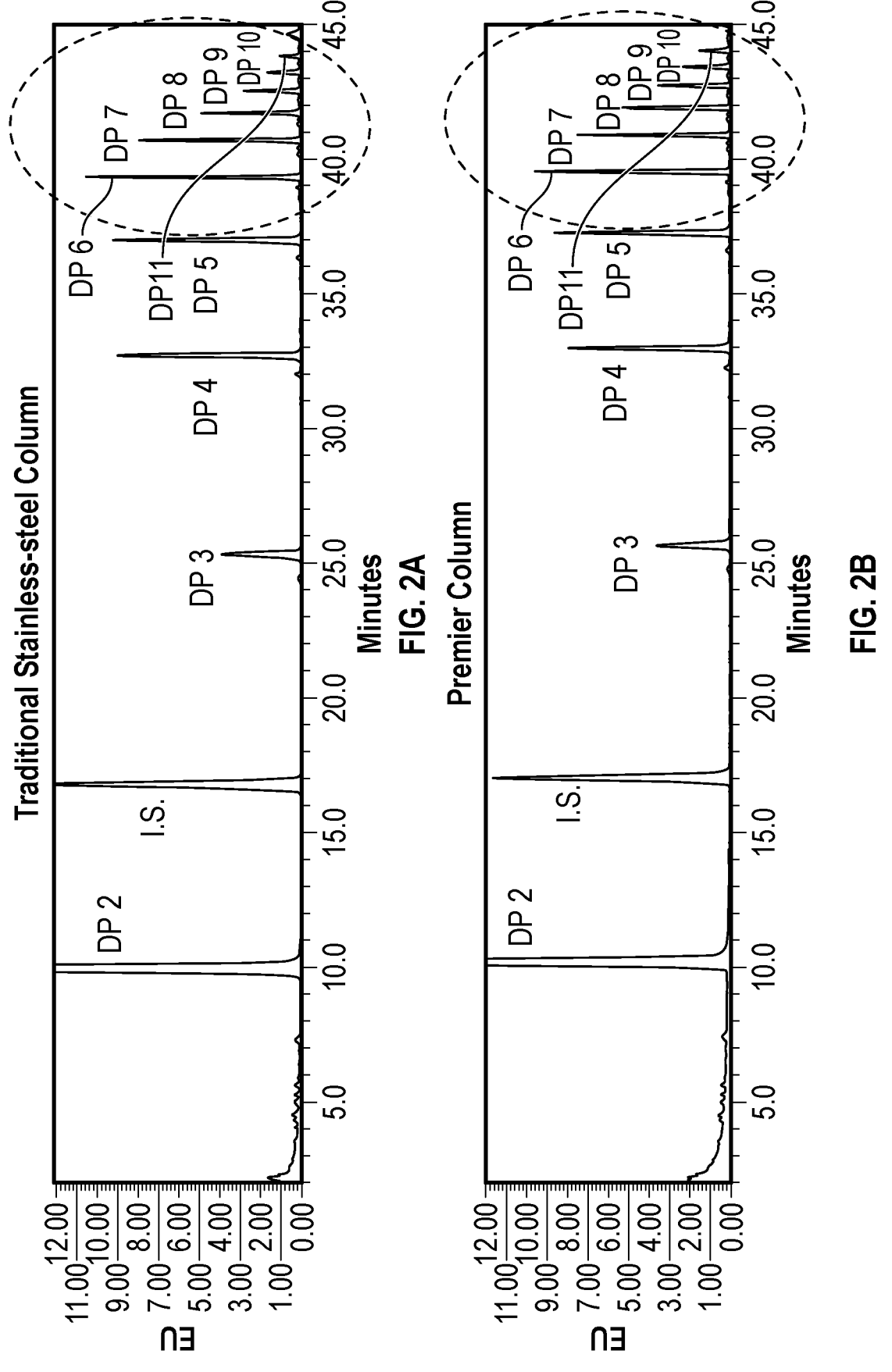
FIG. 2A and FIG. 2B show comparison of 2-AB labeled dextran ladder chromatographs on traditional standard stainless-steel columns (i.e., uncoated columns and uncoated system tubing etc.) (FIG. 2A) and coated Premier columns (i.e., columns and systems coated in accordance with the present technology) (FIG. 2B).

In this disclosure, issues such as analyte loss and carry-over were observed during analysis of oligosaccharides with degree of polymerization (DP) of six or higher compared to oligosaccharide with DP less than 6, when certain conditions were applied in traditional LC. Specifically, in the AOAC Official Method 2021.01 (available from AOAC International, Rockville, MD) for separation of galactooligosaccharides (GOS) by hydrophilic liquid chromatography (HILIC), the loss of analyte was observed for dextran molecules with degree of polymerization (DP) of six or higher. The analyte loss and carry over observed for analysis of oligosaccharide with DP of six or higher were observed to resolve when at least a portion of the wetted surfaces of LC system (metal surfaces) were coated with an alkylsilyl coating that minimizes possible metal-analyte interactions.

The significance of this finding is that it proves for the first time that the size of the molecule can play an important role and should not be neglected in LC when mitigating the issue of metal analyte interaction. This finding broadens the potential impact of alkylsilyl coating on LC analyses and shows that not only metal-sensitive analytes containing strong metal interacting functional groups such as oligonucleotides, but also analytes with long enough chain length, i.e., oligosaccharides with DP of six or higher, and weak metal interacting groups, e.g., hydroxyl groups and acetal groups could benefit from an alkylsilyl coating in LC analysis. The findings presented herein necessitates the need of an alkylsilyl coating that prevents or mitigates any possible interaction of an analyte with the metal surface of a LC system under the AOAC method 2021.01 condition. Without wishing to be bound by theory, oligosaccharides having larger structures, i.e., with DP of six or higher, can present structural regions (microenvironments) with chemical properties that amplify unfavorable interactions with metal surfaces. Accordingly, the alkylsilyl coatings of the present technology is used to modify a flow path of LC systems (or at least some portion of the flow path, such as the HILIC column) to address flow path interactions with an analyte. That is, the alkylsilyl coating used in the methods of the present disclosure minimizes surface reactions with oligosaccharides with DP of six or higher and allows the analyte to pass along a flow path without clogging, attaching to surfaces, or change in analyte properties.

The reduction/elimination of these interactions is advantageous because it allows for accurate quantification and analysis of a sample containing oligosaccharides with DP of six or higher. The sample containing oligosaccharides with DP of six or higher.

In one aspect, provided herein is a method 100 of isolating one or more non-modified oligosaccharide with degree of polymerization 6 or higher from a sample. See FIG. 1.

As used herein, "oligosaccharide" refers to a compound containing two or more monosaccharide units linked by glycosidic bonds.

As used herein, "degree of polymerization" (DP) refers to the number of monomers or monomeric units which are covalently associated together to form a polymer, for example, the number of monosaccharide units in a dextran.

The method 100 presented herein optionally include the step of adding an enzyme 110 to the sample to form a partially hydrolyzed analyte that includes at least one oligosaccharide with degree of polymerization higher than 6. The enzyme may be selected from the group consisting of amyloglucosidase, β-galactosidase and combination thereof.

In some embodiments, the sample is selected from an infant formula, an adult nutritional formula, a nutritional bar, nutritional liquid, and nutritional powder.

As used herein, the term "infant formula" refers to liquid, solid, semi-solid, and semi-liquid human milk replacements or substitutes that are suitable for consumption by an infant.

As used herein, the term "adult nutritional formulation" refers to synthetic formulas including nutritional liquids, nutritional powders, nutritional solids, nutritional semi-solids, nutritional semi-liquids, nutritional supplements, and any other nutritional food product as known in the art. The nutritional powders may be reconstituted to form a nutritional liquid, all of which are suitable for oral consumption by a human.

As used herein, the term "nutritional liquid" refers to nutritional products in ready-to-drink liquid form, concentrated form, and nutritional liquids made by reconstituting the nutritional powders described herein prior to use.

As used herein, the term "nutritional powder" refers to nutritional products in flowable or scoopable form that can be reconstituted with water or another aqueous liquid prior to consumption and includes both spray dried and drymixed/dryblended powders.

The method 100 includes forming a sample having unmodified oligosaccharides with a degree of polymerization of 6 or greater. The method may include adding internal standard 120, e.g., laminaritriose to the sample. The internal standard serves two purposes in the provided method: to normalize the variation that might be introduced in the derivatization and the dilution steps in the sample preparation and to serve as a retention time marker for the system suitability check. For example, the peak area ratios (over the internal standard) may be used in the calibration and the quantitation, and the relative retention times (RRT) of the oligosaccharides compared to internal standard may be used to verify system suitability requirements. After adding the proper internal standard in a known amount to the sample, a fluorescent labeling reagent is added 130 to the sample to label at least one non-modified oligosaccharide with degree of polymerization higher than 6. In some embodiments, the fluorescent labeling reagent can be selected from a fluorophore having an emission wavelength from about 400 nm to about 800 nm and possessing amine and/or N-Hydroxysuccinimide (NHS). In some embodiments, the fluorescent labeling reagent is 2-aminobenzamide (2-AB). In some embodiments, the fluorescent labeling reagent is 6-amino-N-[2-(diethylamino) ethyl]-2-quinolinecarboxamide (6-ADEQ). In some embodiments, the concentration of the fluorescent labeling reagent may be higher than the concentration of the analyte in the sample. After mixing the sample with the fluorescent labeling reagent for a certain period of time, e.g., 1 hour at a certain temperature, e.g., between 40° C. to 80° C., the sample is diluted 140 with acetonitrile/ water solvent mixture. In some examples, the sample is diluted at least 2 times, at least 2.5 times, at least 3 times, at least 5 times of its volume. After diluting the sample 140, the sample is injected 150 onto a hydrophilic interaction liquid chromatography column, which can be connected to a liquid chromatography system. In some embodiments, at least one component of the hydrophilic interaction liquid chromatography column and liquid chromatography system, e.g., Waters™Arc™ Premier System for LC available from Waters Corporation, Milford, MA, 01757, comprises a fluid-contacting alkylsilyl coating on a metal surface (e.g., flow path).

At least one component of the liquid chromatography system may be selected from several components including a fluid manager system (e.g., controls mobile phase flow through the system), tubing (which could also be replaced or used together with micro fabricated fluid conduits), fluid connectors (e.g., fluidic caps), frits, a chromatography column (e.g., XBridge Premier column available from Waters Corporation, Milford, MA, 01757), a sample injector including a needle to insert or inject the sample into the mobile phase, a vial, sinker, or sample reservoir for holding the sample prior to injection, a detector, such as a mass spectrometer, and a pressure regulator for controlling pressure of the flow. Interior surfaces of the components of the chromatographic system form a fluidic flow path that has wetted surfaces.

At least a portion of the wetted surfaces can be coated with an alkylsilyl coating. The coating can be applied by vapor deposition. As such, methods and devices of the present technology provide the advantage of being able to use high pressure resistant materials (e.g., stainless steel) for the creation of the flow system, but also being able to tailor the wetted surfaces of the fluidic flow path to provide the appropriate hydrophobicity so deleterious interactions or undesirable chemical effects on the sample can be minimized. In some examples, the coating of the flow path is non-binding or low-binding or non-interactive with respect to the analyte, such as oligosaccharides with DP 6 or higher.

The alkylsilyl coating can be provided throughout the system from the tubing or fluid conduits all the way through to the detector, e.g., UV detector. The coatings can also be applied to portions of the fluidic path (e.g., at least a portion of the fluidic path). That is, one may choose to coat one or more components or portions of a component and not the entire fluidic path. For example, the internal portions of the column and its frits and end caps can be coated whereas the remainder of the flow path can be left unmodified. Further, removable/replaceable components can be coated. For example, the vial or sinker contained in the sample reservoir can be coated; other replaceable components, such as frits, can be coated as well.

In general, the alkylsilyl coating is applied through a vapor deposition technique. Precursors are charged into a reactor in which the part to be coated is located. Vaporized precursors react on the surfaces of the part to be coated to form a first layer of deposited material. The vapor deposition can be applied in a stepwise function to apply a number of layers of deposited material to the surfaces to grow a thickness of the coating and/or to apply layers of different materials (e.g., alternating between a first and second material) to form the coating.

Further information regarding the coating and the deposition of fluid-contacting coatings in accordance with the present technology is available in US 2019/0086371, which is hereby incorporated by reference. US2019/0086371 also describes tailoring of a coating to meet the needs of a particular sample/analyte.

In some embodiments, the fluid-contacting alkylsilyl coating is made using vapors of bis(trichlorosilyl)ethane, bis(trimethoxysilyl)ethane, bis(trichlorosilyl)octane, bis (trimethoxysilyl)octane, bis(trimethoxysilyl)hexane, and bis (trichlorosilyl)hexane.

In some embodiments, at least a portion of the wetted surfaces of the flow path are coated with multiple layers of the same or different alkylsilyls, where the thickness of the alkylsilyl coatings correlate with the number of layering steps performed (e.g., the number of deposited layers of alkylsilyl coating on wetted surface of the flow path of the chromatographic system/device). In this manner, increasingly thickness of the fluid-contacting coatings can be controlled and tailored to achieve desirable separations.

In some embodiments, the alkylsilyl coating is formed from one or more of the following precursor materials bis(trichlorosilyl)ethane or bis(trimethoxysilyl)ethane. Other embodiments of alkylsilyl coatings suitable for use with the present technology are described in U.S. Patent Publication No. 2019/0086371 (see, in particular Table 1) and U.S. Application Publication No. 2022/0118443 (both of which are hereby incorporated by reference). For example, the alkylsilyl coating can include or consist of a C2 coating, which is the product of vapor deposited bis(trichlorosilyl) ethane or bis(trimethoxysilyl)ethane.

In some embodiments, prior to coating, all metal components are passivated according to a nitric acid passivation. Passivated parts and a silicon wafer are then introduced to the vapor deposition chamber and vacuum is established. In some embodiments, the first step is a 15-minute, 200 Watt, 200 cc/min oxygen plasma cleaning step, and the next step is the first vapor deposition cycle. In some embodiments, each vapor deposition cycle contains a silane vapor deposition, followed by the introduction of water vapor for silane hydrolysis. In one example, the silane vapor is delivered at a pressure of 2.0 Torr for 5 seconds, and then the water vapor is delivered at a pressure of 50 Torr for 5 seconds. Following delivery, the silane and water is left to react with the substrate for 15 minutes. This cycle is repeated to produce the desired number of layers and coating thickness.

After injected the sample onto a hydrophilic interaction liquid chromatography column 150, the injected sample is flowed through the column 160, and separated with the hydrophilic interaction liquid chromatography 170. The separated sample is then passed through a detector to be analyzed. In some embodiments, the detector is a UV detector and/or a fluorescence detector. In certain embodiments, multiple detectors can be used. For example, the UV detector and/or a fluorescence detector can be couple to a mass spectrometer.

METHODS AND EXAMPLES

Example 1: Comparative Examples for 2-AB Labeled Dextran Ladders with DP Values 2 to 11

Using the methods described above, dextran ladders with DP values that varies from 2 to 11 were separated in systems using uncoated hardware and coated hardware in accordance with the present technology. In each of the examples, the comparative chromatograms demonstrate that consistent and high responses have been obtained for dextran ladders having DP 6 or higher using the Premier Glycan BEH Amide column (with alkylsilyl coating). Inconsistent and low responses (for DP≥6) were observed when the conventional Glycan BEH Amide column (without coating) was used.

The samples including dextran molecules were labeled with 2-AB molecules, and HILIC separation of 2-AB labeled dextran ladders were performed under the conditions recommended in AOAC Official Method 2021.01 (available from AOAC International, Rockville, MD).

Standard samples were prepared at 1 mL in aqueous solution for analysis. First, 250 µL water was added to 500 µL dextran solution. Then, the internal standard (laminaritriose) was added to the sample. After taking 20 µL solution from this dextran-internal standard solution, 100 µL water and 100 µL 2-AB labeling reagent were added. The solution was mixed in water bath at 65° C. for 1 hour. After 1 hour, 1 mL of acetonitrile/water solution (75/25 v/v) was added to the mixture prior to analysis. Analysis conditions are provided below.

Methods:

LC system: ACQUITY H-Class Plus (QSM) with ACQUITY FLR Detector. Arc™ Premier System (BSM) with ACQUITY FLR Detector Column: XBridge™ Glycan BEH Amide Column, XBridge™ Premier Glycan BEH Amide Column, 2.5 µm, 2.1×150 mm.

Col. temp.: 25° C.

Inj. Vol.: 2 µL

Run time: 60 min.

Mobile phase A: Acetonitrile

Mobile Phase B: 100 mM ammonium formate pH 4.4

FLR Detector: Excitation λ=330 nm; Emission λ=420 nm

Elution program: (see Table 1 below)

TABLE 1

| | Elution Program | | |
| --- | --- | --- | --- |
| Time (min) | Flow (mL/min) | % A (Acetonitrile) | % B (Ammonium formate 100 mM, pH 4.4) |
| 0 | 0.6 | 88.0 | 12.0 |
| 7.0 | 0.6 | 88.0 | 12.0 |
| 17.0 | 0.6 | 85.0 | 15.0 |
| 21.0 | 0.6 | 85.0 | 15.0 |
| 36.0 | 0.6 | 72.6 | 27.4 |
| 44.0 | 0.6 | 54.0 | 46.0 |
| 44.1 | 0.3 | 54.0 | 46.0 |
| 44.5 | 0.3 | 30.0 | 70.0 |
| 49.5 | 0.3 | 30.0 | 70.0 |
| 52.0 | 0.3 | 88.0 | 12.0 |
| 54.0 | 0.6 | 88.0 | 12.0 |
| 60.0 | 0.6 | 88.0 | 12.0 |

FIG. 2A-FIG. 2B show a comparison of 2AB labeled dextran ladder chromatographs on traditional standard columns (i.e., uncoated columns and system tubing etc.) (FIG. 2A) and coated Premier columns (i.e., columns and systems coated in accordance with the present technology) (FIG. 2B). Difference in relative peak height found for oligosaccharides with DP 6 and higher using the Premier Glycan BEH Amide column compared to the conventional Glycan BEH Amide column shows that the responses obtained in coated column and system is higher compared to the conventional column and system. For example, peak height for DP 8 for the coated column is about 5 EU, whereas the DP 9 peak for the traditional uncoated column is only about 4.8 EU.

Figure 3:
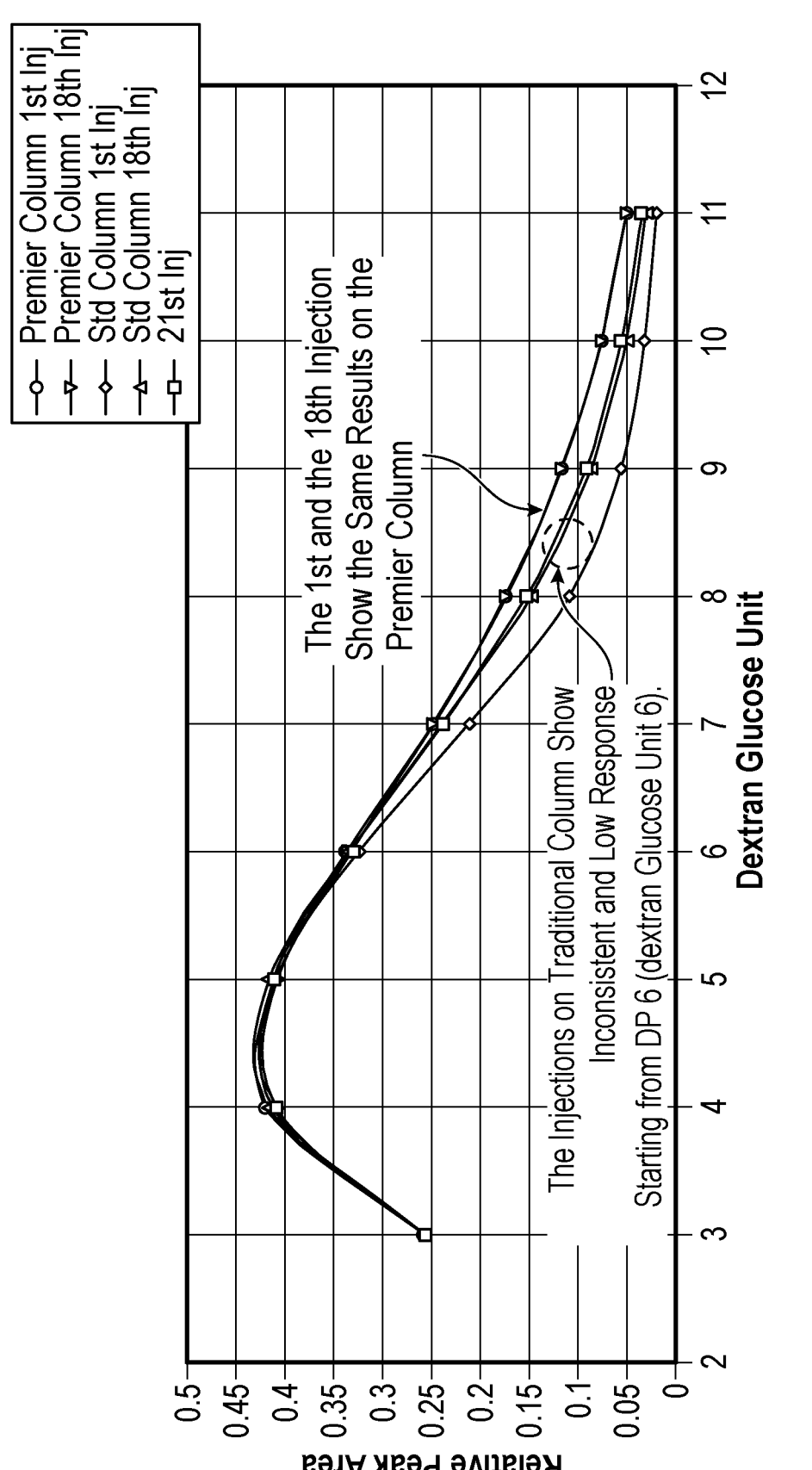
FIG. 3 shows relationship of dextran relative peak area (relative to the internal standard) obtained on coated (Premier) and traditional standard BEH Glycan Amide columns (uncoated).

FIG. 3 shows relationship of dextran relative peak area (relative to the internal standard) obtained on coated (Premier) and traditional standard BEH Glycan Amide columns (uncoated). FIG. 3 shows how the injections on a traditional column show inconsistent and low response starting from DP 6 (dextran glucose unit 6). In contrast, the first and eighteenth injection on the Premier column show the same results proving consistency of the method. The responses were normalized to an I.S. (laminaritriose). The same sample (containing an IS and dextrans with different DP) was used in the comparison.

Figure 4:
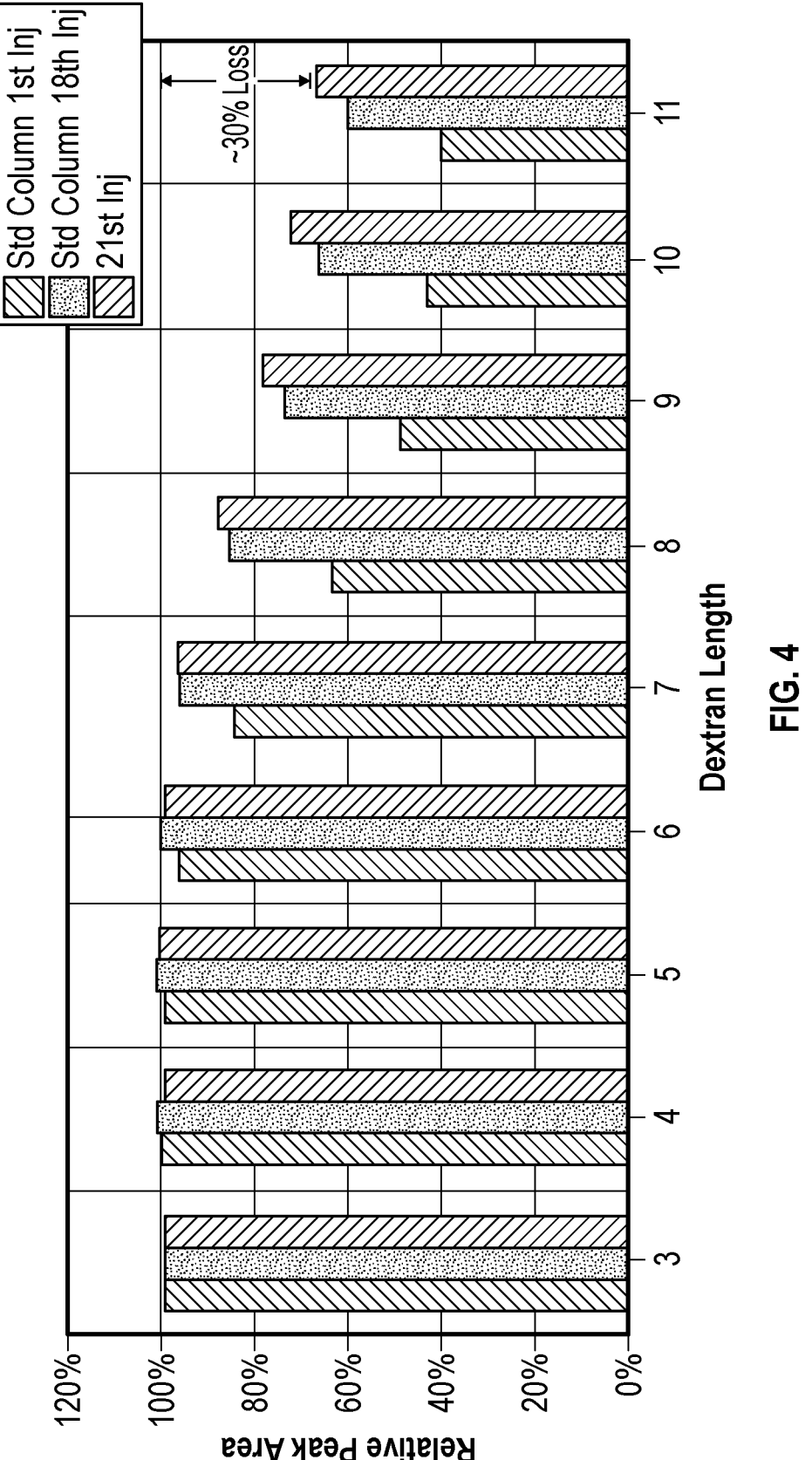
FIG. 4 shows dextran response on standard uncoated columns after $1^{st}$, $18^{th}$ and $21^{st}$ injections, proving loss of analytes for DP 6 or higher. As DP increases, analyte loss increases.

FIG. 4 shows dextran response on standard uncoated columns, proving loss of analytes after DP 6 or higher. As DP increases, analyte loss increases for these uncoated columns.

Figures 5A, 5B:
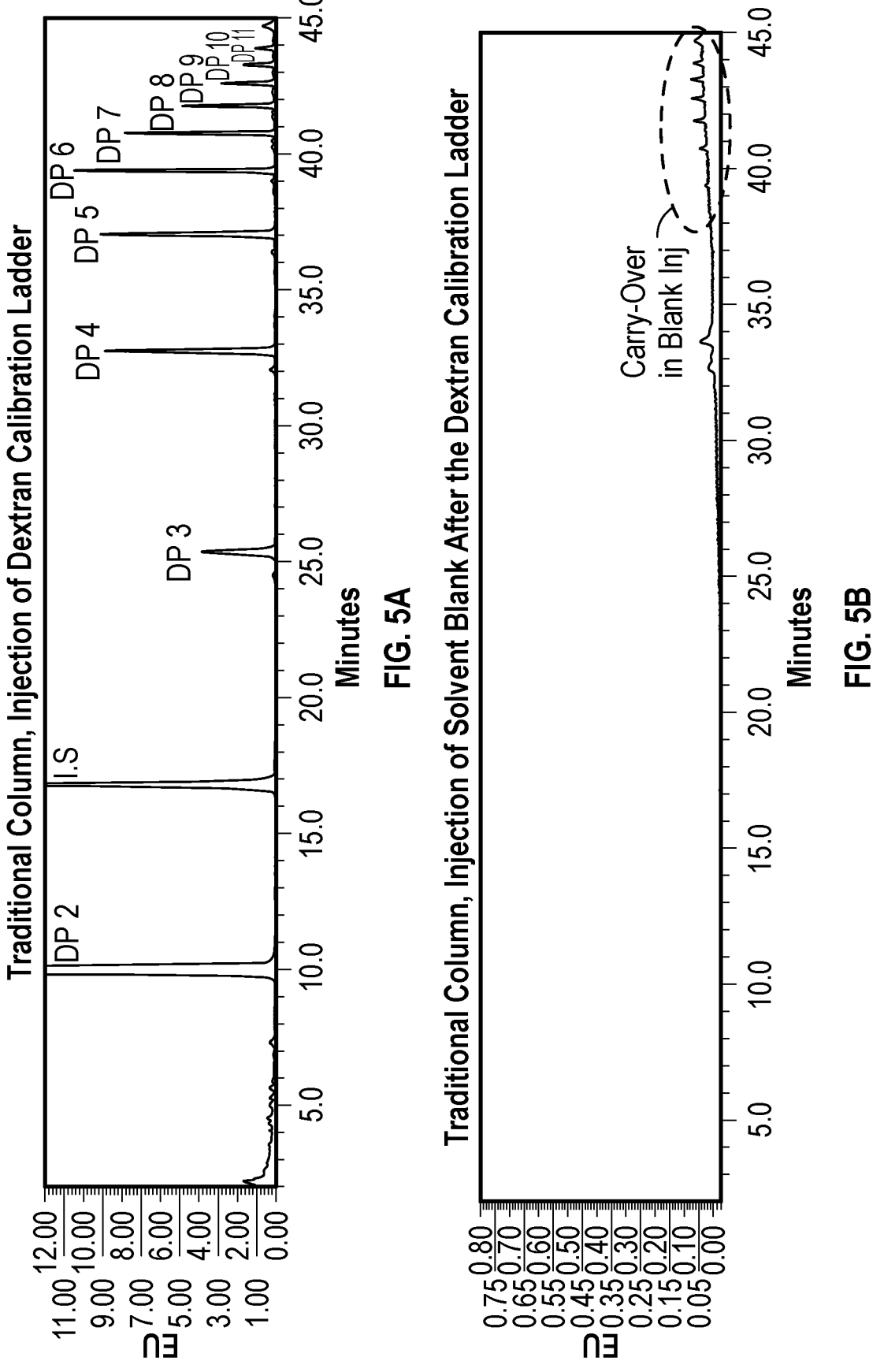
FIG. 5A and FIG. 5B show chromatograms of a dextran ladder (containing DP 2 to 11 and an internal standard) after injected onto a traditional column and a solvent blank after running the dextran ladder in the system, respectively.
Figures 6A, 6B:
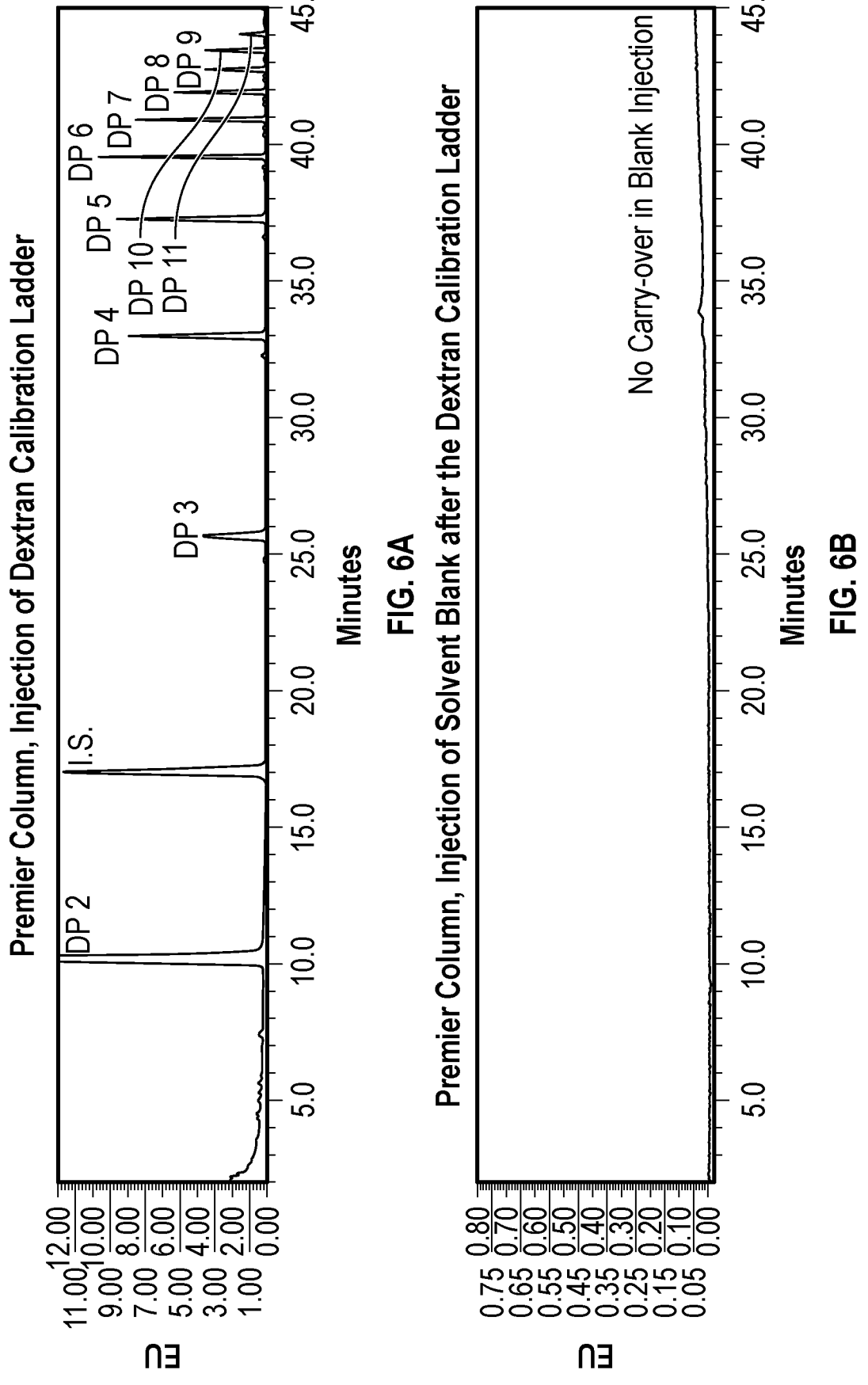
FIG. 6A and FIG. 6B show chromatograms of a dextran ladder (containing DP 2 to 11 and an internal standard) after injected onto a coated Premier column (i.e., alkylsilyl coated) and a solvent blank after running the dextran ladder in the system, respectively.

FIG. 5A and FIG. 6A show chromatograms of a dextran ladder (containing DP 2 to 11 and an internal standard) after injected to a traditional column (i.e., no coating) and traditional system (FIG. 5A) and a coated column and coated system (FIG. 6A). FIG. 5B and FIG. 6B show chromatograms of a solvent blank immediately after running the dextran ladder in the traditional column and system (FIG. 5B) and in the coated column and system (FIG. 6B). While FIG. 6B shows no carry-over (i.e., no measurable carry-over) for dextran ladders with DP 6 or higher, FIG. 5B shows carry-over (measured as 4%) from dextran ladders with DP 6 or higher in the same region of the chromatogram, proving the positive effect of coating on the elimination of carry-over of dextran ladder with DP 6 or higher.

Carry-over results in different systems were investigated. Carry-over is recognized as the presence of small analyte peaks that appear when a blank is injected following the injection of a sample that produces large peaks. When it occurs, peaks attributed to the previously analyzed sample may be observed in the subsequent chromatogram(s) which may co-elute or interfere with desired analytes. Percent carry-over is calculated by the following formula:

% carry-over=(carry-over peak area(s)/internal standard peak area)×100%.

While around 4% carry-over (FIG. 5B) was observed after running dextran ladders with DP 6 or higher on non-Premier column (uncoated) connected to a non-Premier system (uncoated, ACQUITY H Class PLUS), only 0.2% carry-over was observed when the same samples were run on non-Premier column (uncoated) connected to a Premier system (coated, Arc Premier System). No carry-over was observed when samples were run on a Premier column (coated column) connected to a Premier system (coated, Arc Premier System) see FIG. 6B. These results demonstrate the effect of coating on the elimination of carry-over for the analysis of oligosaccharides with DP 6 or higher.

Example 2: Determination of GOS in Infant Formula (AOAC Official Method 2021.01) Using Conventional Columns and LC Systems Determination of GOS in infant formula (AOAC Official Method 2021.01) was carried out on an ACQUITY UPLC H-Class System coupled with an ACQUITY UPLC FLR Detector and an ACQUITY UPLC Glycan BEH Amide Column (standard column or conventional setup—no HPS). Below analytical performance in linearity, sensitivity, repeatability, and accuracy are described.

Calibration Linearity

Figure 7:
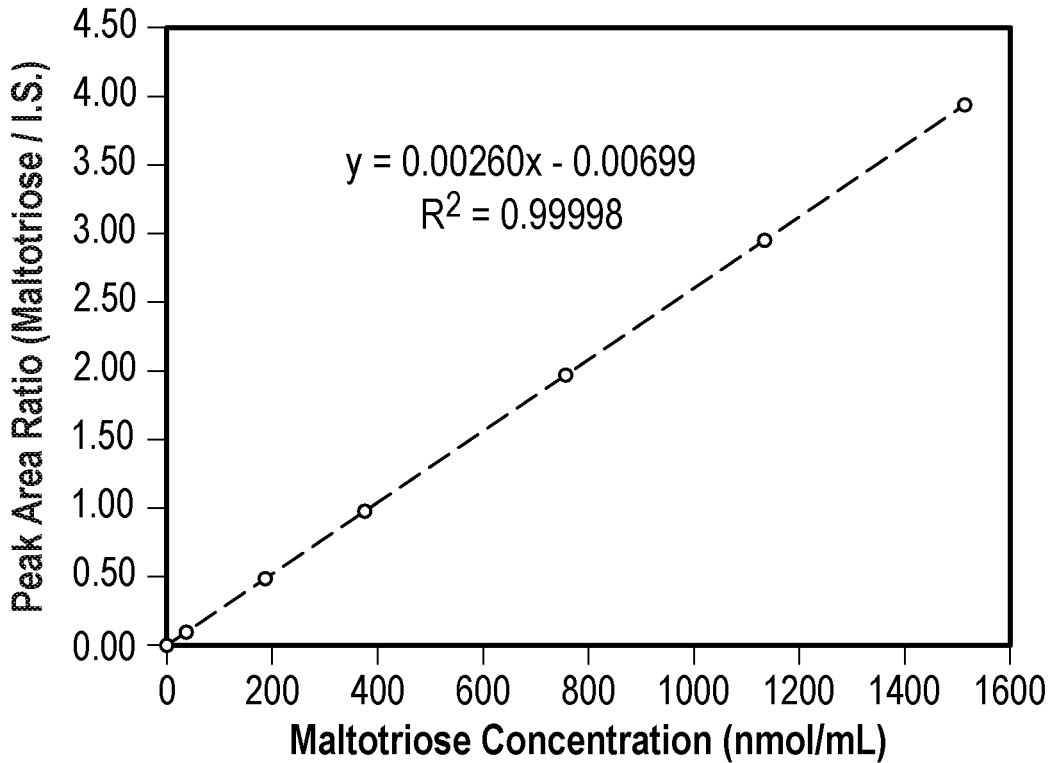
FIG. 7 shows a calibration plot showing a linear relationship between the peak area ratio (maltotriose to internal standard) and molar concentration of maltotriose. Fitted equation and $R^2$ (0.99998) are shown in the plot.

Relationship between the peak area ratio (maltotriose/I.S.) and the maltotriose molar concentration (nmol/mL) is shown in FIG. 7. A linear model by the least squares regression fits the data well with coefficient of determination ($R^2$) of 0.99998. This calibration curve worked for all oligosaccharides because they all had the same response factor (each molecule had one 2-AB label and thus had the same amount of fluorescence signal).

Sensitivity

The limit of quantification (LOQ) was estimated using the lowest concentration standard solution. The standard deviation (SD) of the responses of the lowest concentration standard solution (n=5) was used to estimate the LOQ (at 10 times of SD) (assuming a MW of 342 g/mol and 5 g sample amount). The estimated LOQ values was 0.003 g/100 g, which was within the expectation of the method performance.

Repeatability and Accuracy

The repeatability was assessed by the results of 2 infant formula samples, which were measured twice each day on 2 different days (see, Table 2). Relative standard deviation (RSD) of less than 1.0% were obtained for these two samples, demonstrating a good repeatability performance. Differences of 3.4% and −6.4% were obtained, which are within the performance requirement (within ±10%).

TABLE 2

Repeatability and accuracy in the determination of GOS in infant formula

| Sample | Measured GOS content (g/100 g) | | | | Avg. | |
| | Day 1 | Day 2 | Mean | RSD (n = 4) | Conc[1] (g/100 g) | Rel. Diff. |
|---|---|---|---|---|---|---|
| A | 0.272 | 0.266 | 0.270 | 0.9% | 0.261 | 3.4% |
| | 0.271 | 0.270 | | | | |
| B | 0.190 | 0.187 | 0.188 | 1.0% | 0.201 | −6.4% |
| | 0.185 | 0.189 | | | | |

Note:
[1]Average values from multiple labs.

Sample Analysis

Figures 8A, 8B:
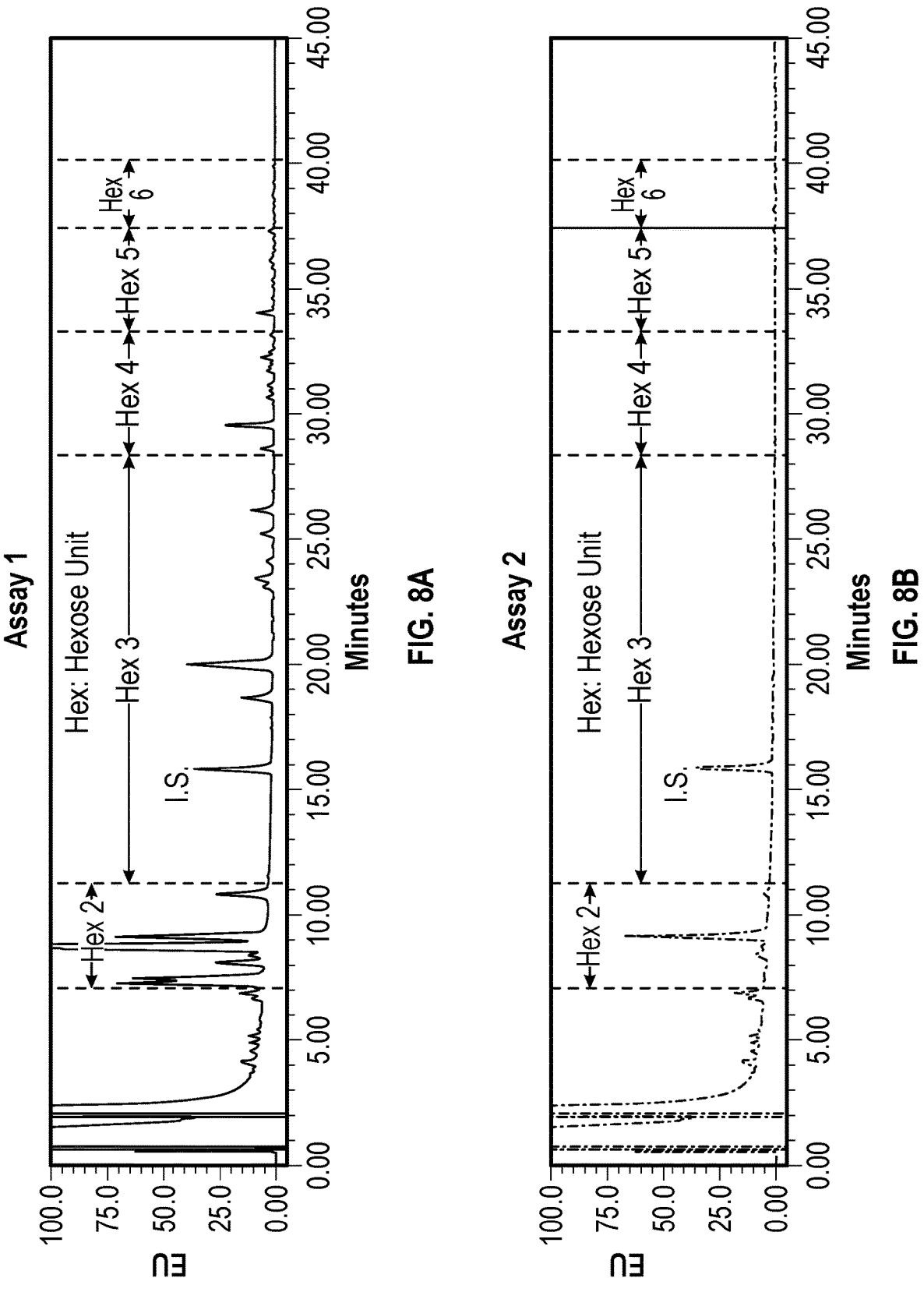
FIG. 8A and FIG. 8B show chromatograms for a typical infant formula sample from Assay 1 and Assay 2, respectively. The retention time windows for oligosaccharides with hexose unit 2 to 6 are indicated in the chromatograms.

FIG. 8A-FIG. 8B show typical chromatograms obtained in the determination of GOS in infant formula. The retention time windows for different hexose units (or DP) are marked in these chromatograms. GOS content was calculated from the difference between assay 1 and assay 2 results. Table 3 shows a comparison of GOS contents determined in our lab and the average values and reproducibility (RSDR) in a multi-lab testing (MLT) study. The relative difference between the observed results and the average MLT results (Rel. Diff. in Table 3) were well within the RSDR, except one from Sample G, which was slightly larger than its RSDR. These results demonstrated excellent accuracy in the analysis of GOS contents in these MLT samples using the ACQUITY UPLC H-Class PLUS System.

TABLE 3

Sample analysis results

| Samples | Avg. Value[1] (g/100 g) | Measured (g/100 g) | Rel. Diff. | $RSD_R$[2] |
|---|---|---|---|---|
| C | 0.59 | 0.61 | 3.4% | 10.3% |
| D | 0.69 | 0.73 | 5.8% | 9.7% |
| E | 0.62 | 0.66 | 6.5% | 8.1% |
| F | 0.86 | 0.87 | 1.2% | 9.5% |
| G | 0.32 | 0.33 | 3.1% | 10.9% |
| H | 0.24 | 0.27 | 12.5% | 11.6% |
| I | 0.84 | 0.90 | 7.1% | 12.1% |

Note:
[1]Average GOS contents obtained in MLT.
[2]Reproducibility obtained in MLT.

Example 3: Comparison Study for Impact of Alkylsilyl Coatings

MaxPeak High Performance Surfaces (i.e., MaxPeak HPS) are alkylsilyl coatings that has been found very useful in mitigating issues such as analyte loss, carry-over, and peak tailing that are related to metal analyte interactions in LC (Waters White Paper, 720006930EN 2020; Waters Application Notes, 720007003EN 2020; Waters Application Notes, 720007014EN 2020; Waters Application Notes, 720006721EN 2020; Waters Application Notes, 720007019EN 2020). The effects of MaxPeak HPS for the analysis of GOS in foods were investigated by a side-by-side comparison approach. Two LC system and column setups were configured. One consisted of an ACQUITY H-Class Plus System and an ACQUITY UPLC Glycan BEH Amide Column (2.5 μm, 2.1×150 mm) and is hereon referred to as a "Conventional Setup"—see Example 2. The other one consisted of an Arc Premier System with an XBridge Premier Glycan BEH Amide Column (2.5 μm, 2.1×150 mm) (HPS Setup). These two setups were essentially the same except that only the HPS Setup was incorporated with alkylsiliyl coatings deposited on fluid-contacting metal surfaces.

Carry-over peaks, or residue peaks from the previous injection, were found in dextran oligosaccharides with DP 6 and higher with the Conventional Setup only (see, FIG. 5A-FIG. 5B). There was no carry-over found in any dextran oligosaccharide when the HPS Setup was used (see, FIG. 6A-FIG. 6B). The extent of carry-over was also to increase with the increase in DP of oligosaccharide. No carry-over observed in small dextran oligosaccharides (DP<6) using the Conventional Setup. The MW dependent behaviour in carry-over was the same as that observed in the analyte loss investigation, which supported the hypothesis that the MW (or size) of dextran oligosaccharide can induce surface adsorption under certain LC conditions. And above all, the facts that no carry-over nor analyte loss was found on the HPS Setup for all dextran oligosaccharides demonstrated that alkylsilyl coating technology could effectively mitigate the analyte loss and carry-over issues for dextran oligosaccharides on the conventional system and column.

While this disclosure has been particularly shown and described with reference to example embodiments thereof, it will be understood by those skilled in the art that various changes in form and details may be made therein without departing from the scope of the technology encompassed by the appended claims.

What is claimed is:

1. A method of separating and analyzing a sample comprising one or more non-modified oligosaccharides with degree of polymerization 6 or higher, the method comprising:
   i. providing a hydrophilic interaction liquid chromatography (HILIC) column, wherein at least one component of the HILIC column comprises a fluid-contacting alkylsilyl coating on metal surfaces;
   ii. injecting the sample onto the HILIC column;
   iii. flowing the sample through the HILIC column; and
   iv. separating and analyzing the sample, wherein carry-over of the one or more non-modified oligosaccharides with degree of polymerization 6 or higher is decreased at least 10× compared to an uncoated HILIC column.

2. The method of claim 1, wherein the analyzing comprises analyzing the separated sample and a blank sample injected after the separated sample with a detector to determine the amount of carry-over.

3. The method of claim 1, wherein carry-over of the one or more non-modified oligosaccharides with degree of polymerization 6 or higher is decreased at least 15× compared to an uncoated HILIC column.

4. The method of claim 1, wherein carry-over of the one or more non-modified oligosaccharides with degree of polymerization 6 or higher is decreased 20× compared to an uncoated HILIC column.

5. The method of claim 1, wherein the fluid-contacting alkylsilyl coating comprises a vapor deposited product of bis(trichlorosilyl)ethane or bis(trimethoxysilyl)ethane.

6. The method of claim 1, further comprising connecting the HILIC column to a liquid chromatography system, wherein internal surfaces of the liquid chromatography system are coated with the fluid-contacting alkylsilyl coating.

7. The method of claim 1, wherein the one or more non-modified oligosaccharides with degree of polymerization 6 or higher is selected from the group consisting of galactooligosaccharides (GOS), fructooligosaccharide, and combination thereof.

8. The method of claim 1, wherein the sample comprises dextran.

9. The method of claim 1, wherein total weight concentration of the one or more non-modified oligosaccharides with degree of polymerization 6 or higher in the sample is from about 0.0005% to about 5% of the sample.

10. The method of claim 1, wherein total weight concentration of the one or more non-modified oligosaccharides with degree of polymerization 6 or higher in the sample is from about 0.003% to about 1% of the sample.

11. The method of claim 1, wherein the analyzing comprises analyzing the separated sample with a UV detector, a fluorescence detector, a mass spectrometer, or a mass spectrometer coupled with a UV detector and/or a fluorescence detector.

12. A method of separating and analyzing one or more non-modified oligosaccharides with degree of polymerization 6 or higher from a sample, the method comprising:
   i. adding a fluorescent labeling reagent to the sample to label at least one of the one or more non-modified oligosaccharides with degree of polymerization 6 or higher to form a fluorescent labeled sample;
   ii. injecting the fluorescent labeled sample onto a hydrophilic interaction liquid chromatography (HILIC) column, wherein at least one component of the HILIC column comprises a fluid-contacting alkylsilyl coating on a metal surface;
   iii. flowing the injected sample through the HILIC column;
   iv. separating the injected sample into components, wherein at least one of the components comprises a fluorescent labeled non-modified oligosaccharide with degree of polymerization 6 or higher; and
   v. analyzing the at least one of the components with a UV detector and/or a fluorescence detector.

13. The method of claim 12, before injecting, further comprising:
   a. adding an internal standard in a known amount to the sample;
   b. diluting the fluorescent labeled sample with acetonitrile/water solvent mixture to form a diluted sample for injection; and
wherein analyzing the at least one of the components comprises quantification of the at least one of the components using a detected peak area of the internal standard.

14. The method of claim 13, wherein the internal standard comprises laminaritriose.

15. The method of claim 13, comprising adding an enzyme selected from the group of consisting of amyloglucosidase, β-galactosidase and combination thereof to the sample prior to adding the internal standard.

16. The method of claim 12, wherein the fluid-contacting alkylsilyl coating comprises a vapor deposited product of bis(trichlorosilyl)ethane or bis(trimethoxysilyl)ethane.

17. The method of claim 12, wherein the one or more non-modified oligosaccharides with degree of polymerization 6 or higher is selected from the group consisting of galactooligosaccharides (GOS), fructooligosaccharide and combination thereof.

18. The method of claim 12, wherein the UV detector or the fluorescence detector is coupled to a mass spectrometer.

19. The method of claim 12, wherein the fluorescent labeling reagent is 2-aminobenzamide or 6-amino-N-[2-(diethylamino) ethyl]-2-quinolinecarboxamide.

20. The method of claim 12, wherein the sample is a nutritional bar, nutritional liquid, or nutritional powder.

* * * * *